United States Patent [19]

Cadeo et al.

[11] 3,837,914

[45] Sept. 24, 1974

[54] METHOD AND APPARATUS FOR DISSOLVING SUGAR AND OTHER SOLUBLE SOLIDS

[75] Inventors: Angelo Cadeo; Josef Cavelti, both of Rothrist, Switzerland

[73] Assignee: Frebar A.G., Zug, Switzerland

[22] Filed: May 23, 1972

[21] Appl. No.: 256,121

[52] U.S. Cl.......................... 127/22, 23/309, 127/63
[51] Int. Cl............................ B01f 1/00, C13f 1/14
[58] Field of Search ............... 127/22, 63; 239/310; 23/309

[56] References Cited
UNITED STATES PATENTS

| | | | |
|---|---|---|---|
| 2,751,335 | 6/1956 | Carver | 23/309 X |
| 3,428,487 | 2/1969 | Allen | 127/22 |
| 3,692,579 | 9/1972 | Lauer | 127/22 |

*Primary Examiner*—Morris O. Wolk
*Assistant Examiner*—Sidney Marantz
*Attorney, Agent, or Firm*—Sherman & Shalloway

[57] ABSTRACT

A continuous method of, and apparatus for, forming a solution of a powdered solid, such as sugar, which involves introducing the solid and a solvent, such as water, into a first dissolving unit, continuously withdrawing a portion of the contents of the first unit into a second dissolving unit, continuously re-cycling the contents of the second dissolving unit back to the first dissolving unit and continuously withdrawing the resulting solution from the second dissolving unit. Each dissolving unit is provided with means, such as a nozzle and a splach plate, to impart a facilitating dissolving motion to the solution being transferred from one dissolving unit to the other.

38 Claims, 4 Drawing Figures

METHOD AND APPARATUS FOR DISSOLVING SUGAR AND OTHER SOLUBLE SOLIDS

FIELD OF THE INVENTION

The present invention is directed to a method and apparatus for dissolving sugar and other soluble solids in water or other solvents. More specifically, the present invention is directed to a continuous method for effecting such dissolving of sugar and other soluble solids as well as apparatus effective for carrying out such continuous method.

BACKGROUND OF THE INVENTION

Sugar and other soluble solids are conventionally made available in a powder or crystalline form notwithstanding the fact that there are numerous well known advantages of liquid sugar to commercial users of sugar and other solid materials in food manufacturing and processing. While such advantages associated with the use of liquid sugar and other solid materials in liquid form are well known, transportation costs involved in moving liquid sugar which are, of course, based on the total weight of sugar and water, mitigate against its more wide spread use and are an important reason why liquid sugar is not readily available on a competitive basis with dry sugar at least on a wide spread scale.

In the production of sugar solutions for large scale commerical uses, such as in the baking, confectionery and similar food industries, the sugar is conventionally dissolved by adding sugar solids to a hot agitated quantity of water. The common technique of forming the sugar solution by adding the sugar solids to hot water has the disadvantage that when the sugar is first introduced into water, the sugar solids tend to form lumps or chunks of agglomerated particles which become glazed on their surface resulting in a retarding or inhibiting the dissolution of the sugar crystals. All the reasons for this phenomenon are not particularly clear, it is assumed that the water which is generally hot in order to expedite the dissolution of the sugar forms a concentrated solution when it first contacts the outer crystals of the lumps formed when the sugar particles agglomerate and this concentrated solution penetrates inwardly in contact with more solid sugar and, as it does, the solid sugar within the mass cools and further saturates the solution in contact with it. When this occurs, a point is reached at which cooling of the saturated solution takes place, resulting in crystallization, crystals being formed in the interstices among the sugar particles acting as a "cement" forming a difficultly permeable mass of material. Such a mass of particles acts in a similar manner to a chunk or mass of solid sugar and is difficultly soluble in view of the limited surface area compared to the original crystal particles. Accordingly, the dissolving weight of such mass of "cemented" particles is quite low, thereby requiring large agitators and vessels for effecting dissolution of such masses of material. Similar phenomenon occur when other crystalline solids are dissolved in water and similar solvents, thereby making commerical dissolution of these materials quite costly.

Various proposals have been made to eliminate the foregoing disadvantage of conventional sugar dissolving systems and systems for dissolving similar water soluble solids. While such proposals have, to some extent, eliminated the foregoing disadvantage with regard to the agglomeration of the soluble material, such previous proposals have been unsatisfactory from the stand point of providing a commerically attractive method in that each of the proposals prior to the development of the present invention has been based on the assumption that a dissolving of sugar and similar water soluble solids must be carried out on a batch basis and no effective continuous process for the dissolution of such materials has yet been developed. For example, U.S. Pat. Nos. 2,929,747 and 3,428,487 include recent proposals for the dissolution of sugar and similar water soluble solids. While the procedure set forth in each of these patents may be effective to some extent for eliminating the problem associated with the agglomeration of the crystals, the procedures set forth in these patents are insufficient from a commerical stand point since, again, the dissolution of sugar or other water soluble solids has been proposed only on a batch basis.

The foregoing disadvantages of conventional procedures for dissolving sugar and similar solids have been overcome in accordance with the present invention which comprises a continuous method for dissolving such soluble materials and apparatus to effect such dissolution. The continuous method of the present invention involves forming a solution of sugar or soluble solid by introducing the fine or powdered material and water or other solvent into a first dissolving unit maintained under conditions of temperature and internal motion as to effect a dissolving of a substantial portion of the solids; continuously withdrawing a portion of the contents of the first dissolving unit and introducing such withdrawn portion into a second dissolving unit maintained under such conditions of internal motion as to effect a dissolving of substantially all of the solids not dissolved in the first dissolving unit; continuously withdrawing a portion of the contents of the second dissolving unit and re-introducing such withdrawn portion into the first dissolving unit as a recycle; and continuously withdrawing a concentrated solution of the sugar or other soluble solids from the second dissolving unit. In a preferred embodiment of the present invention, the contents withdrawn from the first dissolving unit are introduced into the second dissolving unit and the contents recycled from the second dissolving unit into the first dissolving unit are introduced by means of a reactor tube located within each of the dissolving units, each reactor tube ending in a nozzle with a means to divert the flow of contents from the nozzle, thereby at least initially forming in the first and second dissolving units a net flow of contents which is an axially symmetrical radial jet creating a random generally spiral motion.

The apparatus in accordance with the present invention for carrying out such method includes in combination a first dissolving vessel and means for introducing sugar or another soluble solid and water or other solvent into the first dissolving vessel; a first conduit means for continuously withdrawing a portion of the contents of the first dissolving vessel and means associated therewith for pumping the contents withdrawn from the first dissolving vessel through a first reactor tube and into a second dissolving vessel, the reactor tube having one end communicating with the pump and one end located in the second dissolving vessel; means for withdrawing a portion of the contents from the second dissolving vessel and recycling the same to the first dissolving vessel, such means including a second conduit means having one end in communication with the second dissolving vessel and the opposite end located in the first dissolving vessel; and means for withdrawing the desired sugar solution or solution of another soluble solid from the second dissolving vessel.

In accordance with a preferred embodiment of the present invention, the first and second reactor tubes of the second and first dissolving vessels, respectively, end in a nozzle having spaced a short distance therefrom a means to divert the flow of contents from such nozzle, thereby initially forming in the first and second dissolving units, a net flow of contents which is an axially symmetrical radial jet creating a random generally spiral motion.

Accordingly, it is a principal object of the present invention to provide a method and apparatus for dissolving sugar and similar soluble solids, which method and apparatus eliminate the disadvantages and defects of prior proposed processes and apparatus developed heretofore.

It is a further object of the present invention to provide a novel continuous method for dissolving sugar and similar soluble solids which comprises introducing the sugar crystals or powder of the similar soluble solid and water or other solvent into a first dissolving unit so as to effect a dissolving of a substantial portion thereof, continuously withdrawing a portion of the solids and introducing the withdrawn portion into a second dissolving unit so as to effect a dissolving of the remainder of the solids, continuously withdrawing a portion of the contents of the second dissolving unit and reintroduced or recycling the withdrawn portion into the first dissolving unit, and continuously withdrawing the desired solution of crystals of sugar or similar soluble solid from the second dissolving unit.

It is still a further object of the present invention to provide such continuous method of forming an aqueous solution of sugar or similar water soluble solid wherein the contents of such first dissolving unit are introduced into the second dissolving unit and the contents of the second dissolving unit recycled into the first dissolving unit by means of a reactor tube ending in a reactor nozzle with a means spaced a short distance therefrom to divert the flow of contents from such nozzle, thereby effecting a net flow of contents which is an axially symmetrical radial jet creating a random generally spiral motion in both the first and second dissolving units.

It is a still further object of the present invention to provide such method for dissolving sugar in water wherein the sugar crystals and water are introduced into the first dissolving unit as a function of a measurement of the concentration of sugar in the final aqueous solution withdrawn from the second dissolving unit.

It is yet a further object of the present invention to provide such method of dissolving sugar to similar water soluble solid in water wherein the contents of the second dissolving unit are passed through a sieve prior to being withdrawn from the second dissolving unit.

A still further object of the present invention relates to the novel apparatus for dissolving sugar or similar soluble crystalline solid in water or solvent which comprises in combination a first dissolving vessel, means for introducing sugar crystals or similar powders of a soluble solid and water or solvent into the first dissolving vessel, first conduit means for continuously withdrawing a portion of the contents of the first dissolving vessel, pump means and a first reactor tube having one end connected to the pump and one end located in a second dissolving vessel, means for withdrawing a portion of the contents from the second dissolving vessel and recycling such withdrawn contents to the first dissolving vessel, and means for withdrawing the desired sugar solution or solution of another soluble solid from the second dissolving vessel.

It is a further object of the present invention to provide such novel apparatus for dissolving sugar or similar soluble solids wherein the contents of the first dissolving vessel are introduced into the second dissolving vessel and the contents of the second dissolving vessel are recycled into the first dissolving vessel by means of reactor tubes ending in nozzles having spaced a short distance therefrom, a means for diverting the flow of contents from the nozzle, thereby at least initially creating in the first and second dissolving vessels a net flow of contents which is an axially symmetrical radial jet creating a random generally spiral motion.

Yet a further object of the present invention is to provide such apparatus for dissolving sugar and similar soluble solids further including means for measuring the concentration of sugar or other solid in the final solution and effecting an introduction of the crystals and water or solvent into the first dissolving unit based upon such measurement of concentration.

Yet a further object of the present invention relates to the second dissolving unit employed in the foregoing apparatus, such dissolving unit including sieve means located within the path of the contents withdrawn from the second dissolving unit as the final product.

Still further objects and advantages of the novel method and apparatus of the present invention will become more apparent from the following more detailed description thereof.

BRIEF DESCRIPTION OF THE DRAWINGS

The foregoing features of the present invention and the objects and advantages thereof will be further described by reference to the drawings wherein.

DESCRIPTION OF THE PREFERRED EMBODIMENTS

As indicated previously, the present invention is directed to a method and apparatus for dissolving sugar and other soluble solids, preferably in an aqueous medium. While the discussion which follows of the preferred embodiments of the present invention will be directed primarily to the dissolving of sugar in water, it should be readily recognized that the present invention is not to be limited thereto but rather includes the dissolving of other soluble solids which behave in a manner similar to sugar in the dissolving process. For example, mention can be made of such solid materials as alum, sodium hydroxide, and similar soluble solids or salts, all of which are embraced by the expression "soluble, fine or powdered solid." Similarly, while water is the preferred solvent for dissolving any solvent capable of dissolving, the soluble solid can be advantageously employed and the expression "solvent" is meant to embrace all such conventionally employed materials. Again, however, the discussion which follows will be directed primarily to the preferred embodiment of the present invention wherein the method and apparatus described herein are employed for dissolving sugar in water, specifically for the preparation of a highly concentrated sugar solution, i.e., one of a concentration of about 60 brix or greater.

In manner contrary to previously proposed methods and apparatus for dissolving sugar in water, the method of the present invention in being continuous and the apparatus useful therefor, have distinct advantages over conventional apparatus in the economic savings associated with the continuous nature of the process. For example, through the method and apparatus of the present invention, it is possible to have labor savings due to the automatic features of the process, capital savings in requiring less apparatus, and storage capacity savings due to the fact that the sugar solution or solution of similar soluble solid is continuously produced. Moreover, through the process and apparatus of the present invention, it is possible to obtain the final solution at a desired concentration within a margin of ± 0.30 brix. Such features of the present invention will be seen by reference to FIG. 1 which schematically illustrates the method and apparatus of the present invention.

Figures 1, 3:
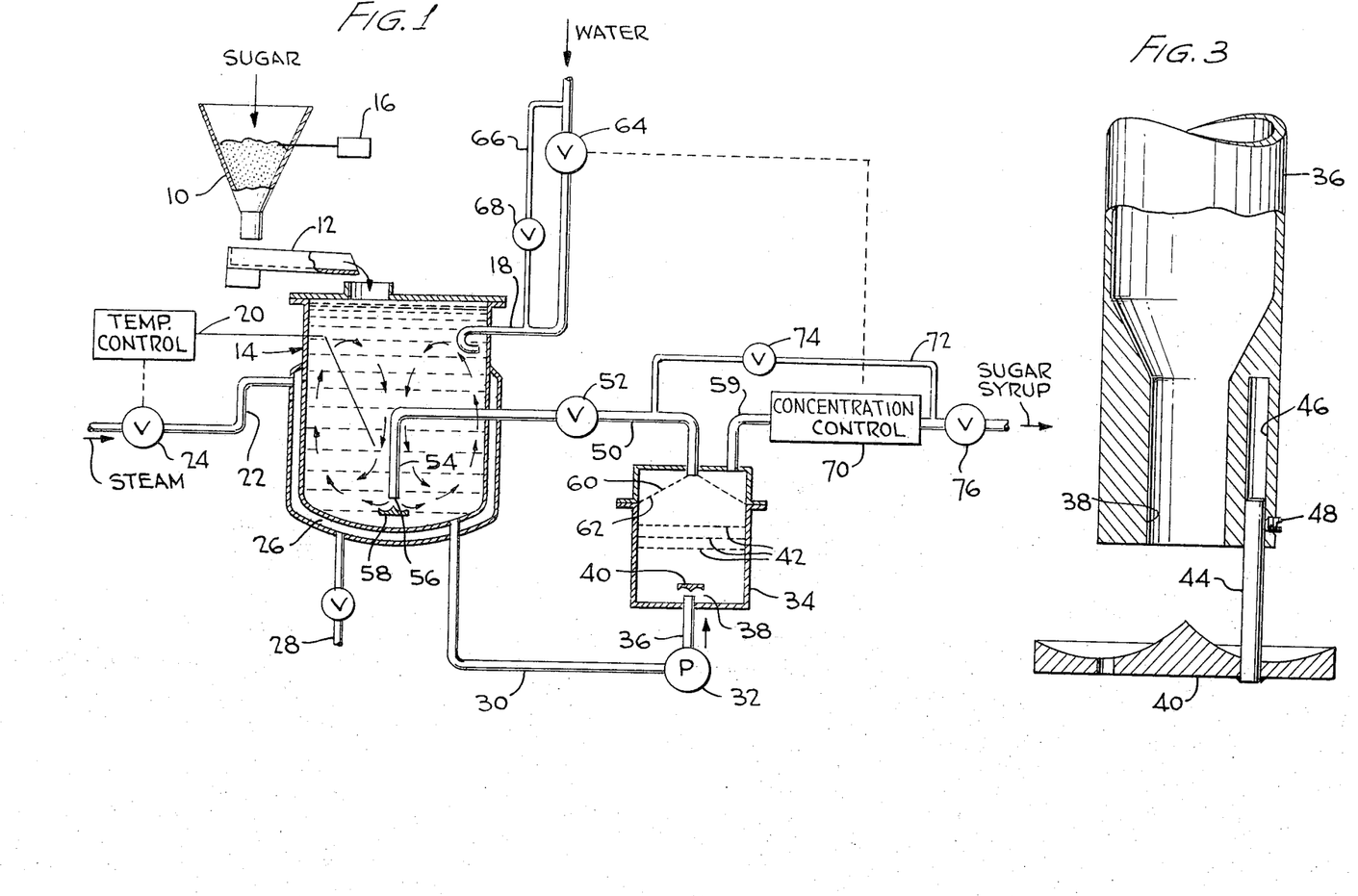
FIG. 1 is a schematic diagram of the apparatus utilized in carrying out the method of the present invention.
FIG. 3 is a cross-sectional diagram of the reactor tube, nozzle and splash plate employed in the first and second dissolving units of the apparatus of FIG. 1.

Referring to FIG. 1, sugar is supplied from any convenient source to a sugar hopper 10 located above a vibratory trough or moving, endless belt 12 which conveys the sugar into the first dissolving unit or vessel 14. Sugar hopper 10 is equipped with a suitable means 16 to measure and control the level of the sugar crystals in the hopper. Such means 16 can be any conventional means which measures the level of a solid material.

The first dissolving unit or vessel 14 is equipped with an inlet 18 for introducing the dissolving medium, in this case, water. While FIG. 1 shows the introducing of the water as a stream running down the side of the first dissolving unit or vessel 14 due to the positioning of water inlet 18, it should be readily apparent that the water can be introduced at any point within the first dissolving unit or vessel 14.

Sugar can be effectively dissolved in water at ambient temperatures up to a concentration of approx. 60 brix. In this regard, brix refers to the concentration or strength scale commonly used in the food processing industry in connection with liquid sugar solutions, a concentration of 60 brix corresponding to 60 weight per cent sugar. Where it is desired to form a more concentrated sugar solution or where soluble crystalline solids other than sugar are being dissolved in the aqueous or solvent system, it may be advantageous to supply heat to the first dissolving unit or vessel 14. For the purposes of supplying heat to the first dissolving unit or vessel 14, a temperature indicator 20 of conventional design is located within vessel 14, such temperature indicator 20 being associated with an introduction of steam through line 22, the introduction of steam being controlled by valve 24 automatically opening and closing in response to variations in temperature as measured by temperature indicator 20. It is obvious that such means to measure temperature and to introduce steam in response thereto is conventional in the art and any typically employed system can be advantageously adapted to the method and apparatus for dissolving sugar and similar soluble solids in accordance with the present invention.

The steam introduced through line 22 heats the vessel 14 through steam jacket 26 of conventional design, a steam trap 28 being provided to vent off condensate.

As indicated above, when forming sugar solutions of approximately 60 brix or less, the dissolving of the sugar in water can be carried out at ambient temperatures. Where heating is carried out to facilitate further dissolution of the sugar, the first dissolving unit or vessel 14 is generally heated to a temperature of not more than about 95°C.

A portion of the contents of the first dissolving unit or vessel 14 are withdrawn therefrom through conduit 30 and pumped by means of a pump 32 into a second dissolving unit or vessel 34. Pump 32 can be of any conventional design, the only requirement being that the pump be capable of pumping the sugar solution and mixed sugar crystals. It is preferable in accordance with the present invention to utilize a centrifugal pump conventionally employed in the food processing industry.

The contents withdrawn from the first dissolving unit or vessel 14 are pumped into the second dissolving unit or vessel 34 through a conduit or reactor tube 36, one end of which communicates with pump 32 and the other end of which is located within the second dissolving unit or vessel 34. While the design of the conduit or reactor tube 36 can be of any conventional design, it is preferable in accordance with the present invention and a more effective and efficient mixing of the sugar and water takes place when the reactor tube 36 has a nozzle opening 38, such nozzle opening being shown in more detail in connection with FIG. 3. Again, while the nozzle arrangement more clearly shown in FIG. 3 is a preferred embodiment for the reactor tube 36 introducing the contents of the first dissolving unit or vessel 14 into the second dissolving unit or vessel 34, such reactor tube 36 having a nozzle opening 38 at the end thereof can be replaced by a straight, cut tube or other conventional means for introducing liquid contents.

As seen in FIG. 1, a means 40, in this case a splash plate, is located a short distance from the nozzle opening 38 of reactor tube 36 so as to divert the flow of the contents issuing from reactor tube 36. This tends to at least initially create in the second dissolving unit 34 a net flow of contents which is an axially symmetrical radial jet creating a random generally spiral motion. As more clearly seen in FIG. 3, the splash plate 40 is of such a design as to initiate the rotating or spiral motion of the contents in the second dissolving unit or vessel 34.

Figures 2, 4:
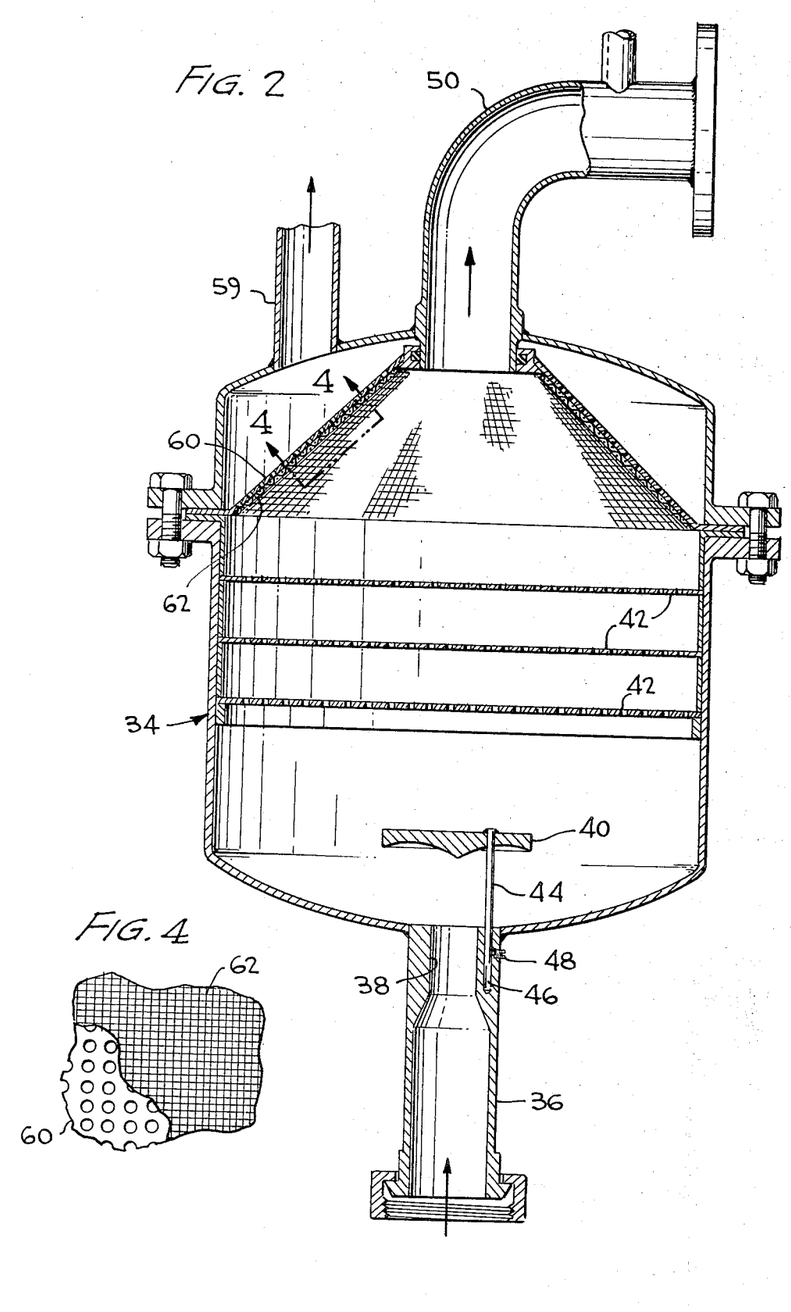
FIG. 2 is a cross-sectional view of the second dissolving unit employed in the method and apparatus of the present invention.
FIG. 4 is a broken cross-sectional view of the sieve and related structure of the second dissolving unit of FIG. 2 taken along line 4—4.

As seen in FIG. 1 and as more clearly seen by reference to FIG. 2, the second dissolving unit or vessel 34 has perforated plates 42 utilized to decrease the turbulence within the upper portion of the second dissolving unit or vessel 34, tranquilizing the turbulence down to a minimum flow within this upper section of the vessel. While both FIGS. 1 and 2 illustrate the employment of three such perforated plates, it is, of course, obvious that a lesser or greater number of the same can be employed within the second dissolving unit or vessel 34 in order to achieve the desired results in any particular application of the present method and apparatus.

As further seen in FIG. 2, splash plate 40 is movably connected to reactor tube 36 so as to allow varying of the distance between the nozzle 38 and splash plate 40, the means to effect such movement including a rod attachment 44 movable in slot 46 of the reactor tube 36 with fixing of any position being accomplished by means of set screw 48. This feature of the reactor tube, nozzle and splash plate arrangement can be more clearly seen by reference to FIG. 3.

In this regard, FIG. 3 comprises an enlargement of the reactor tube, nozzle and splash plate arrangement as seen in FIGS. 1 and 2.

In a preferred embodiment of the present invention, the distance between the reactor nozzle 38 and the splash plate 40 is from 0.5 to 3 times the diameter of the reactor opening. It has been found that when this parameter is satisfied, maximum turbulence is created and maximum mixing obtained through the generally spiral motion and random motion given to the contents passing through the nozzle 38 and impinging the splash plate 40 at a high rate of speed. Moreover, as indicated previously, since the ends of the splash plate are turned away from the flow from the nozzle, this has a tendency to further accelerate the rotational, spiral motion within the dissolving unit or vessel.

In the upper portion of the second dissolving unit or vessel 34, the sugar solution is separated into a final product portion and a portion for recycle back to the first dissolving unit or vessel 14. In this regard, in accordance with the method of the present invention, from about 50 percent to about 99 percent of the flow of contents is recycled to the first dissolving unit or vessel 14 with the remaining portion being withdrawn from dissolving unit or vessel 34 as the final product, i.e., the concentrated sugar solution. The portion of the contents which are recycled to the first dissolving unit or vessel 14 pass directly out of the second dissolving unit or vessel 34 by means of a centrally located conduit 50. Such portion of the contents of the second dissolving unit or vessel 34 which is recycled to the first dissolving unit or vessel 14 will contain the concentrated sugar solution and any undissolved sugar particles. In this regard, all of the particles which remain undissolved in the second dissolving unit or vessel 34 are recycled to the first dissolving unit or vessel 14 and do not pass out of the second dissolving unit or vessel 34 as the desired product.

The flow of the circulating contents in conduit 50 is controlled by means of a valve 52 and conduit 50 ends in the first dissolving unit or vessel 14 in a second reactor tube 54 having a nozzle opening 56 at the end thereof.

As was the case in connection with the reactor tube and nozzle of the second dissolving unit or vessel 34, the nozzle opening 56 of reactor tube 54 of the first dissolving unit or vessel 14 is spaced a short distance from a means to divert the flow of contents from the reactor tube, i.e., a splash plate 58. The arrangement of the splash plate 58 and nozzle 56 and reactor tube 54 is substantially identical with that of the arrangement in connection with the second dissolving unit or vessel 34. Hereagain, however, the use of such nozzle and splash plate arrangement in the first dissolving unit or vessel 14 is a preferred embodiment of the present invention and such means for effecting rapid mixing of the contents of the first dissolving unit or vessel 14 can be replaced by other conventional means, such as straight cut tubes.

With respect to the use of the splash plate 58 in the first dissolving unit or vessel 14, it is pointed out that instead of the splash plate, the reactor nozzle can be sufficiently close to the bottom of the dissolving unit or vessel 14 as to allow the bottom of the vessel to divert the flow of the recirculating contents and produce the desired net flow of contents which is an axially symmetrical radial jet creating a random generally spiral motion. Such motion of the contents in the first dissolving unit or vessel 14 is shown by the flow lines represented. The use of the splash plate, however, is preferred in accordance with the present invention since the structure of the splash plate aids in initiating the rotating spiral motion of the contents within the first dissolving unit or vessel 14.

As indicated previously, the use of such reactor tube, nozzle and splash plate arrangement is preferred in accordance with the present invention since the rapid turbulent motion which is created allows for a more effective and efficient mixing of the sugar crystals and water than possible with conventional, mechanical or turbine mixers and, as such, provides for a rapid dissolution of the sugar in the water in a manner not heretofore possible with conventional apparatus. In this connection, in the first dissolving unit or vessel 14 a substantial portion of the sugar crystals are rapidly dissolved, thereby producing a flow to the second dissolving unit or vessel 34 which comprises the concentrated sugar solution containing a substantially reduced amount of sugar crystals.

Returning to the second dissolving unit or vessel and FIG. 2 specifically, it is noted that the portion of the contents of the second dissolving unit or vessel 34 which is not recycled to the first dissolving unit or vessel 14 passes out of the second dissolving unit or vessel 34 as the final product, i.e., concentrated sugar solution. The final product leaves the second dissolving unit or vessel 34 through line or conduit 59 after passing through a perforated plate 60 having on its upstream side a sieve 62. The arrangement of the perforated plate 60 and sieve 62 can be further seen by reference to FIG. 4.

As seen in FIG. 2, the perforated plate 60 is in the form of a cone shape with a sieve 62 covering its upstream side. The mesh size of the sieve is selected in accordance with the present invention so as to eliminate the possibility that an appreciable amount of undissolved sugar crystals can pass out of the second dissolving unit or vessel 34 through conduit 59. While it is of course obvious that, for this purpose, the mesh size of sieve 62 can be smaller than the sugar crystals, it has been found in accordance with the present invention that even where the mesh size of sieve 62 is larger than the remaining sugar crystals, substantially no sugar crystals pass through sieve 62, perforated plate 60 and out through product line or conduit 59. While the reason for this phenomenon is not quite clear, it appears as though some dissolving of the sugar crystals occurs on sieve 62 itself, thereby preventing the sugar crystals from passing through the sieve but allowing the concentrated solution of sugar or sugar syrup to pass through.

In connection with the above, it has been discovered in accordance with the present invention that the mesh size of the sieve 62, i.e., the width between wire and wire is preferably about 0.25 mm, i.e., larger than the size of the sugar crystals which are generally between 0.1 and 1.5 mm in the second dissolving unit or vessel 34. Notwithstanding the fact that the mesh size of sieve 62 is larger than the crystal size of the sugar, the sugar crystals do not pass through sieve 62 and perforated plate 60, but rather substantially all of the crystals not yet dissolved are recycled into the first dissolving unit or vessel 14 through conduit or line 50. As seen in FIG. 1, product line 59 and recycle line 50 are constructed with elbows and blockages can be inserted within the lines so as to create the necessary pressure drop to effect the desired flow of contents through recycle line 50 and through product line 59. By proper selection well known to one of ordinary skill in the art it is possible to, in this way, maintain the desired flow of the concentrated sugar solution out of the second dissolving unit or vessel 34 through line 59 while maintaining a constant recycle of the sugar syrup and undissolved crystals through line 50 back into the first dissolving unit or vessel 14. It is noted also from FIGS. 1 and 2 that the second dissolving unit or vessel 34 need not be equipped with a steam jacket or other means to heat the vessel since, due to its small size, heating is not required to effect further dissolution of the sugar crystals undissolved in the first dissolving unit or vessel 14.

The dissolved product passing out of the second dissolving unit or vessel 34 through line 59 passes through a suitable means 70 to measure the density or concentration of the sugar in the solution, such means being a conventional refractometer. In order to maintain the desired concentration of sugar in the final solution, the measurement of the density or concentration automatically controls valve 64 located in the water inlet line 18. Accordingly, through this arrangement, the amount of water introduced into the first dissolving unit or vessel 14 is automatically controlled in response to the measurement of the density of the final sugar solution or concentration of sugar therein. Water inlet line 18 is equipped with a bypass 66 and valve 68 associated therewith, which bypass and valve allow the water to be introduced notwithstanding the density or concentration measurement. This bypass line 66 and valve 68 are conventionally utilized in the start up of the continuous dissolving method.

Located downstream of the density or concentration control means 70 is a bypass line 72 which, through valve 74, leads back to the recirculating line 50 between the second dissolving unit 34 and the first dissolving unit 14. This bypass line 72 is utilized when starting up the continuous method. The automatic safety shut-off valve 76 located downstream of the density or concentration measuring means 70 and bypass line 72 is closed and water is fed into the first dissolving unit or vessel 14 through line 18, the water being allowed to pass through the system, through conduit 30, pump 32, reactor tube 36, the second dissolving unit or vessel 34, through line 59 and back into the first dissolving unit or vessel 14 through bypass line 72, recycle line 50 and reactor tube 54. Sugar is, at this time, continuously added to the system and when the recirculating product has reached the desired concentration value, and when the product passing through line 59 has achieved the desired concentration, the refractometer 70 automatically opens the automatic safety shut-off valve, thereby forming a continuous process. At this point, the density or concentration control means 70 controls the amount of water fed into the unit by measuring the concentration of the sugar in the final product, thereby allowing the concentration to be maintained throughout the system. The sugar syrup which is produced at a process of the present invention is now ready for additional use which can be in the form of a filling plant, a bottling plant or an additional mixing unit adding a food flavoring to the product.

To summarize the operation of the apparatus of the present invention, it is pointed out that the sugar crystals or similar soluble crystalline solid and water or solvent are introduced into the first dissolving unit which, as previously noted, is maintained under such conditions of temperature and internal motion so as to effect a dissolving of a substantial portion of the solids in this first dissolving unit or vessel. A portion of the contents of this first dissolving unit or vessel is continuously withdrawn and pumped into a second dissolving unit or vessel which is also maintained under such conditions of internal motion so as to effect a dissolving of substantially all of the crystals which are not dissolved in the first dissolving unit. Preferably, in accordance with the present invention, the portion withdrawn from the first dissolving unit or vessel and introduced into the second dissolving unit or vessel is introduced through a centrally located reactor tube having at an end within the second dissolving unit a nozzle and a means spaced a short distance therefrom to divert the flow of the contents into the second dissolving unit or vessel so as to at least initially form in the second dissolving unit or vessel a net flow of contents which is an axially symmetrical radial jet creating a random generally spiral or rotating motion. A portion of the contents from the second dissolving unit or vessel is continuously withdrawn and reintroduced or recycled into the first dissolving unit or vessel. Preferably, in accordance with the method and apparatus of the present invention, such recycled portion is reintroduced into the first dissolving unit or vessel through a centrally located tube having at the end within the first dissolving unit a further nozzle and means positioned a short distance therefrom so as to divert the flow of recirculating contents, thereby forming in the first dissolving unit a net flow of contents which is an axially symmetrical radial jet creating a random generally spiral or rotating motion. A portion of the contents of the second dissolving unit or vessel is also continuously withdrawn as the desired product, i.e., sugar syrup or other solution of the soluble solid. In accordance with additional features of the present invention, the density or concentration of the final product is measured and, in response thereto, the water or solvent is added to the first dissolving unit or vessel so as to maintain the desired concentration of sugar or similar soluble solid in the final product. Similarly, a temperature control means can be associated with the first dissolving unit or vessel so as to maintain the desired temperature within the same by means of a steam jacket.

A characteristic feature of the present invention resides in the second dissolving unit or vessel which can include one or more perforated plates so as to tranquilize within the upper portion of the second dissolving unit or vessel the random spiral motion of the contents introduced therein from the first dissolving unit or vessel. Similarly, the second dissolving unit or vessel is characterized by the fact that the same includes in the upper portion thereof a perforated plate having a sieve on the upstream side thereof so as to provide a means for assuring that substantially no undissolved crystals are passed out of the second dissolving unit or vessel through the product line. As indicated previously, this effect is achieved notwithstanding the fact that the mesh of the sieve may be larger than the sugar crystals.

Through the continuous method of the present invention, and through the apparatus described, it is possible to eliminate the inherent deficiencies of conventional methods and apparatus by providing for the continuous dissolution of sugar in water as well as other soluble solids which behave in a manner similar to sugar. In this respect, through the method and apparatus of the present invention, due to the continuous nature thereof, it is possible to have considerable savings in capital, storage capacity and other savings in space, while not in any way reducing the quality of the final product. In this respect, through the method of the present invention, it is possible to produce a sugar solution or a solution of another soluble solid within a margin of $\pm 0.3°$ brix of the desired value.

While the present invention has been described primarily with respect to the foregoing preferred embodiments, particularly by reference to the attached drawings, it is noted that the present invention is in no way to be deemed as limited thereto, but rather must be construed as broadly as any and all equivalents thereof.

What is claimed is:

1. A continuous method of forming a solution of a fine or powdered solid which comprises:
    a. introducing a fine solid and a solvent therefor into a first dissolving unit maintained under such conditions of temperature and internal motion as to effect a dissolving of a substantial portion of the solid;
    b. continuously withdrawing a portion of the contents of said first dissolving unit and introducing the withdrawn portion into a second dissolving unit with a random, generally spiral motion while the second dissolving unit is maintained under such conditions of internal motion as to effect a dissolving of substantially all of the solid not dissolved in said first dissolving unit;
    c. continuously withdrawing a portion of the contents of said second dissolving unit and reintroducing the withdrawn portion into said first dissolving unit with a random, generally spiral motion; and
    d. continuously withdrawing a solution of said solid from said second dissolving unit.

2. The method of claim 1 wherein the solid and solvent are introduced into said first dissolving unit in accordance with a measurement of the concentration of the solid in the solution withdrawn from said second dissolving unit.

3. The method of claim 1 wherein the contents of said second dissolving unit are passed through a sieve prior to being withdrawn as said solution.

4. The method of claim 1 wherein the contents of said first dissolving unit are heated in response to a measurement of the temperature in said first dissolving unit.

5. The method of claim 4 wherein the heating is conducted by means of steam circulating in a jacket surrounding said first dissolving unit.

6. The method of claim 1 wherein from 50 percent – 99 percent of the contents of said second dissolving unit is reintroduced into said first dissolving unit.

7. A continuous method of forming a concentrated solution of a water soluble solid which comprises:
    a. introducing a fine solid and water into a first dissolving unit maintained under such conditions of temperature and internal motion as to effect a dissolving of a substantial portion of said solid;
    b. continuously withdrawing a portion of the contents of said first dissolving unit and introducing the withdrawn portion into a second dissolving unit maintained under such conditions of internal motion as to effect a dissolving of substantially all of the solid not dissolved in said first dissolving unit, the withdrawn portion being introduced into said second dissolving unit through a centrally located tube having at an end within said second dissolving unit a first nozzle, a first means for diverting the flow from said nozzle being positioned a short distance from said first nozzle, thereby initially forming in said second dissolving unit a net flow of contents which is an axially symmetrical radial jet creating a random generally spiral motion;
    c. continuously withdrawing a portion of the contents of said second dissolving unit and reintroducing the withdrawn portion into said first dissolving unit, the withdrawn portion reintroduced into said first dissolving unit being reintroduced through a centrally located tube having at an end within said first dissolving unit a second nozzle, a second means for diverting the flow from said second nozzle being positioned a short distance from said second nozzle, thereby forming in said first dissolving unit a net flow of contents which is an axially symmetrical radial jet creating a random generally spiral motion;

and
    d. continuously withdrawing a concentrated solution of the solid from said second dissolving unit.

8. The method of claim 7 wherein the fine solid and water are introduced into said first dissolving unit in accordance with a measurement of the concentration of the solid in the aqueous solution withdrawn from said second dissolving unit.

9. The method of claim 7 wherein the contents of said second dissolving unit are passed through a sieve prior to being withdrawn as said aqueous solution.

10. The method of claim 7 wherein the contents of said first dissolving unit are heated in response to a measurement of the temperature in said first dissolving unit.

11. The method of claim 10 wherein the heating is conducted by means of steam circulating in a jacket surrounding said first dissolving unit.

12. The method of claim 7 wherein from 50 percent – 99 percent of the contents of said second dissolving unit is reintroduced into said first dissolving unit.

13. A continuous method of forming an aqueous solution of sugar which comprises:
    a. introducing sugar crystals and water into a first dissolving unit maintained under such conditions of temperature and internal motion as to effect a dissolving of a substantial portion of said crystals;

b. continuously withdrawing a portion of the contents of said first dissolving unit and introducing the withdrawn portion into a second dissolving unit with a random, generally spiral motion while the second dissolving unit is maintained under such conditions of internal motion as to effect a dissolving of substantially all of the crystals not dissolved in said first dissolving unit;

c. continuously withdrawing a portion of the contents of said second dissolving unit and reintroducing the withdrawn portion into said first dissolving unit with a random, generally spiral motion; and d. continuously withdrawing an aqueous solution of sugar from said second dissolving unit.

14. The method of claim 13 wherein the sugar crystals and water are introduced into said first dissolving unit in accordance with a measurement of the concentration of the sugar crystals in the aqueous solution withdrawn from said second dissolving unit.

15. The method of claim 13 wherein the contents of said second dissolving unit are passed through a sieve prior to being withdrawn as said aqueous solution.

16. The method of claim 13 wherein the contents of said first dissolving unit are heated in response to a measurement of the temperature in said first dissolving unit.

17. The method of claim 16 wherein the heating is conducted by means of steam circulating in a jacket surrounding said first dissolving unit.

18. The method of claim 13 wherein from 50 percent – 99 percent of the contents of said second dissolving unit is reintroduced into said first dissolving unit.

19. The method of claim 13 wherein the aqueous solution of sugar withdrawn from the second dissolving unit has a concentration of at least 60 brix.

20. A continuous method of forming a concentrated aqueous solution of sugar which comprises:

a. introducing sugar crystals and water into a first dissolving unit maintained under such conditions of temperature and internal motion as to effect a dissolving of a substantial portion of said crystals;

b. continuously withdrawing a portion of the contents of said first dissolving unit and introducing the withdrawn portion into a second dissolving unit maintained under such conditions of internal motion as to effect a dissolving of substantially all of the crystals not dissolved in said first dissolving unit, the withdrawn portion being introduced into said second dissolving unit through a centrally located tube having at an end within said second dissolving unit a first nozzle, a first means for diverting the flow from said nozzle being positioned a short distance from said first nozzle, thereby initially forming in said second dissolving unit a net flow of contents which is an axially symmetrical radial jet creating a random generally spiral motion;

c. continuously withdrawing a portion of the contents of said second dissolving unit and reintroducing the withdrawn portion into said first dissolving unit, the withdrawn portion reintroduced into said first dissolving unit being reintroduced through a centrally located tube having at an end within said first dissolving unit a second nozzle, a second means for diverting the flow from said second nozzle being positioned a short distance from said second nozzle, thereby forming in said first dissolving unit a net flow of contents which is an axially symmetrical radial jet creating a random generally spiral motion;

and d. continuously withdrawing a concentrated aqueous solution of sugar from said second dissolving unit.

21. The method of claim 20 wherein the sugar crystals and water are introduced into said first dissolving unit in accordance with a measurement of the concentration of the sugar crystals in the aqueous solution withdrawn from said second dissolving unit.

22. The method of claim 20 wherein the contents of said second dissolving unit are passed through a sieve prior to being withdrawn as said aqueous solution.

23. The method of claim 20 wherein the contents of said first dissolving unit are heated in response to a measurement of the temperature in said first dissolving unit.

24. The method of claim 23 wherein the heating is conducted by means of steam circulating in a jacket surrounding said first dissolving unit.

25. The method of claim 20 wherein from 50 percent – 99 percent of the contents of said second dissolving unit is reintroduced into said first dissolving unit.

26. The method of claim 20 wherein the aqueous solution of sugar withdrawn from the second dissolving unit has a concentration of at least 60 brix.

27. Apparatus for dissolving a fine solid in a solvent therefor which comprises in combination a. a first dissolving vessel;

b. means for introducing solids into said first dissolving vessel;

c. means for introducing a solvent for said solids into said first dissolving vessel;

d. first conduit means for continuously withdrawing a portion of the contents of said first dissolving vessel and pump means associated with said conduit means, one end of said conduit means being in communication with said first dissolving vessel and the other end being in communication with said pump means;

e. a second dissolving vessel receiving said contents withdrawn from said first dissolving vessel through said conduit means, pump means and a first reactor tube having one end connected to said pump and one end located in said second dissolving vessel;

f. a first nozzle attached to said end of said first reactor tube in said second reactor vessel and a first means for diverting the flow of contents from said first nozzle spaced a short distance from said first nozzle;

g. means for withdrawing a portion of the contents from said second dissolving vessel and recycling the withdrawn contents to said first dissolving vessel, said means for withdrawing including a second conduit means having one end in communication with said second dissolving vessel and the opposite end ending in a reactor tube located in said first dissolving vessel;

h. a second nozzle attached to said second reactor tube and a second means for diverting the flow of recycling contents from said second nozzle spaced a short distance from said second nozzle; and i. means for withdrawing the desired solution from said second dissolving vessel.

28. The apparatus of claim 27 wherein said second dissolving vessel includes at least one perforated plate to tranquilize the motion of the contents in said second dissolving vessel.

29. The apparatus of claim 27 wherein said second dissolving vessel further includes a sieve located in the path of the contents withdrawn from said second dissolving vessel as the desired solution.

30. The apparatus of claim 27 further including means to measure the temperature of the contents of said first dissolving vessel and means responsive to the measurement of temperature to heat said first dissolving vessel.

31. The apparatus of claim 27 further including means to measure the concentration of the solid in said desired solution withdrawn from said second dissolving vessel and means to regulate the quantity of solvent introduced into said first dissolving vessle in response to the measurement of concentration.

32. The apparatus of claim 27 wherein said solid is sugar and said solvent is water.

33. Apparatus for use in dissolving sugar and similar solids in a solvent therefor in a continuous dissolving system including:
  a. a mixing chamber of generally cylindrical configuration;
  b. inlet means for introducing contents comprising a mixture of soluble solids and dissolved solids into the bottom of said mixing chamber, said inlet means ending in said mixing chamber in a nozzle opening;
  c. means spaced a short distance above the bottom of said mixing chamber in line with the flow of contents from said nozzle opening to divert the flow of contents from said nozzle opening, thereby initially creating a flow of contents which is an axially symmetrical radial jet creating random generally spiral motion;
  d. means for withdrawing a desired solution from said mixing chamber; and
  e. means to withdraw a portion of the contents of said mixing chamber for recycle to the dissolving system, said means to withdraw the desired solution having associated therewith a sieve means positioned so that the contents of said mixing chamber withdrawn through said means to withdraw the desired solution pass through said sieve means.

34. The apparatus of claim 33 wherein said means to divert the flow of contents from said nozzle opening is a splash plate, the outer ends of said splash plate turning toward said nozzle opening to initiate the random generally spiral motion.

35. The apparatus of claim 34 wherein the distance between said nozzle opening and said splash plate is 0.5 to 3 times the diameter of said nozzle opening.

36. The apparatus of claim 33 wherein said means to tranquilize the random generally spiral motion comprises at least one perforated plate.

37. The apparatus of claim 36 wherein the number of perforated plates is three.

38. The apparatus of claim 33 wherein said sieve means is located on the down-stream side of a perforated plate.

* * * * *